3,549,664
ANTHRAQUINONE DYESTUFFS

Manfred Groll, Cologne-Stammheim, Klaus Wunderlich, Leverkusen, and Hans-Samuel Bien, Burscheid, Germany, assignors to Farbenfabriken Bayer Aktiengesellschaft, Leverkusen, Germany, a corporation of Germany
No Drawing. Filed May 9, 1966, Ser. No. 548,410
Claims priority, application Germany, May 20, 1965,
F 46,097
Int. Cl. C09b 1/12, 1/24, 1/52
U.S. Cl. 260—371                                10 Claims

ABSTRACT OF THE DISCLOSURE

Anthraquinone dyestuffs especially suitable for dyeing and printing of fibre materials of cellulose esters, polyamides, polyurethanes, polyacrylonitriles, and aromatic polyesters comprising anthraquinones containing two or more auxochrome groups linked to the anthraquinone nucleus and a sulphonic acid aryl ester group linked with the anthraquinone nucleus.

---

This invention relates to new valuable anthraquinone compounds and to their use as dyestuffs especially for synthetic fibers.

It has been found that valuable anthraquinone dyestuffs are obtained, when anthraquinone compounds which are free from sulphonic and sulphinic acid groups and contain, optionally besides other substituents, a sulphonic acid halide group linked with the anthraquinone nucleus, are reacted with an optionally substituted phenol and, if the anthraquinone radical does not contain at least two auxochrome groups, an appropriate number of auxochrome groups are subsequently introduced into the anthraquinone radical by known methods.

The anthraquinone dyestuffs which are obtained according to the invention and contain a sulphonic acid aryl ester group and at least two auxochrome groups, possibly besides other substituents, are very suitable as dyestuffs for synthetic materials.

The anthraquinone-sulphonic acid chlorides can be obtained from anthraquinone-sulphonic acids or their salts by the methods commonly used with the aid of chlorosulphonic acid, thionyl chloride, phosphorus oxychloride phosphorus pentachloride.

The phenols used according to the invention may also contain one, two or three substituents, for example, halogen, such as fluorine, chlorine or bromine; alkyl groups, especially lower alkyl groups, such as methyl, ethyl, propyl, isobutyl groups; hydroxyl groups; alkoxy groups, especially lower alkoxy groups, such as methoxy, ethoxy, propoxy, isopropoxy, isobutoxy groups; alkyl-mercapto groups, especially lower alkyl-mercapto groups, such as methyl-mercapto, ethyl-mercapto groups; alkyl-sulphonyl, especially lower alkyl-sulphonyl groups, such as methylsulphonyl, ethyl-sulphonyl, propyl-sulphonyl groups; nitro groups; carboxy groups; carbalkoxy groups, such as carbomethoxy, carbethoxy, carbisobutoxy groups; acyl groups, such as acetyl and benzoyl groups; and also trifluoromethyl groups.

Examples of these compounds are the following: phenol, p-chlorophenol, m-chlorophenol, o-chlorophenol, p-bromophenol, o-, m-, p-cresol, 2,4-dichorophenol, 3,4-dimethyl-phenol, 3-chloro-6-methyl-phenol, p-methyl-mercapto-phenol, m-methoxy-phenol, p-methoxy-phenol, p-acetyl-phenol, 3-hydroxy-benzoic acid, 4-hydroxy-benzoic acid methyl ester, p-trifluoromethyl-phenol, 3-nitrophenol, α-naphthol and β-naphthol.

The reaction of the anthraquinone-sulphonic acid halides can be carried out according to the invention in an aqueous medium or in an organic solvent, and the operation is generally performed with the addition of an acid-binding agent, such as an alkali metal hydroxide, alkali metal carbonate or tertiary amine. Examples of organic solvents are: chlorobenzene, o-dichlorobenzene, nitrobenzene, dimethyl formamide, diglycol monomethyl ether and acetone. The reaction can be carried out at room temperature or at higher or lower temperatures, for example, between −20° C. and +100° C., preferably at 0 to 60° C.

As has been mentioned above, the dyestuffs produced according to the invention must contain at least two auxochrome groups in the anthraquinone radical. Preferred auxochrome groups are hydroxyl and amino groups which may be substituted by alkyl radicals, preferably lower alkyl radicals with up to 4 carbon atoms, or by phenyl radicals which may in turn be substituted. The amino groups may also be substituted by lower aliphatic acyl radicals with up to 4 carbon atoms or by alkyl-sulphonyl radicals with up to 4 carbon atoms or by optionally substituted aryl-sulphonyl radicals. Ether and thioether groups may also be contained in the anthraquinone radicals as auxochrome groups. The above auxochrome groups may be contained in the anthraquinone radicals from the start or they may be subsequently introduced.

Examples of starting materials for those anthraquinone derivatives which already contain at least two auxochrome groups in the anthraquinone molecule are:

1,4-diamino-2,3-dichloro-anthraquinone-6-sulphonic acid chloride,
1-amino-5-hydroxy-anthraquinone-2-sulphonic acid chloride,
1-amino-4-bromo-5-hydroxy-anthraquinone-2-sulphonic acid chloride,
1-amino-8-hydroxy-anthraquinone-2-sulphonic acid chloride,
1-amino-4-bromo-8-hydroxy-anthraquinone-2-sulphonic acid chloride,
1-amino-5,8-dihydroxy-anthraquinone-2-sulphonic acid chloride,
1,4-dihydroxy-anthraquinone-2-sulphonic acid chloride,
1,4-dihydroxy-anthraquinone-6-sulphonic acid chloride,
1,5-dihydroxy-4,8-diamino-anthraquinone-2-sulphonic acid chloride.

Examples of starting materials for those anthraquinone derivatives into which auxochrome groups must or can be subsequently introduced are:

1-amino-4-bromo - anthraquinone-2-sulphonic acid chloride,
1-amino-4-bromo-5-nitro-anthaquinone-2 - sulphonic acid chloride,
1-amino-4-bromo-5-(6-, 7- or 8-)-chloro-anthraquinone-2-sulphonic acid chloride,
1-amino-4-bromo - 5,8 - dichloro-anthraquinone - 2 - sulphonic acid chloride,
1-amino-4-bromo-5-hydroxy-anthraquinone-2 - sulphonic acid chloride,
1-amino-4-bromo-8-hydroxy-anthraquinone - 2-sulphonic acid chloride,
1-amino-4-bromo - 5,8 - dihydroxy-anthraquinone-2-sulphonic acid chloride,
1-nitro-anthraquinone-5-(6-, 7- or 8-)-sulphonic acid chloride.

The subsequent introduction of auxochrome groups can be carried out by customary chemical methods. For example, a halogen atom in nuclear position can be exchanged for an amino, alkylamino, arylamino, tosylamino, phenylmercapto, methoxy or phenoxy group. It is also possible to reduce nitro groups to amino groups.

The nitro groups or halogen atoms may be present in the original anthraquinone-sulphonic acids or they may be introduced by subsequent halogenation or nitration of the anthraquinone-sulphonic acid aryl esters. The following methods may be mentioned by way of example:

1-amino-4-bromo-anthraquinone-2 - sulphonic acid aryl esters are reacted with amines, p-toluene-sulphamide or phenyl-mercaptans. In the case of the resultant tosylamino compounds, the tosylamino group can also be further converted into the amino group by acidic hydrolysis.

1-nitro-anthraquinone-5-(6,7,8) - sulphonic acid phenyl esters are reduced to the 1-amino compound, this is converted into the 2,4-dibromo compound by bromination, and the 4-positioned bromine atom is exchanged for an amine or toluene-sulphamide radical. In the last-mentioned case, the 1,4-diamino-anthraquinone-5-(6,7,8) - sulphonic acid phenyl ester can easily be obtained by acdiic hydrolysis.

It is also possible, for example, to convert 1,4-diamino-anthraquinone-sulphonic acid phenyl esters via the quinone-imines into the 1-hydroxy-4-amino compounds.

The following dyestuffs can be obtained by the process according to the invention, for example:

1,4-diamino-anthraquinone-2-sulphonic acid-(3'-methoxyphenyl) ester,
1,4-diamino-anthraquinone-2-sulphonic acid-(3'-chloro-6'-methyl-phenyl) ester,
1,4-diamino-2,3-dichloro-anthraquinone-6 - sulphonic acid phenyl ester,
1,4-diamino-5-hydroxy-anthraquinone - 2-sulphonic acid phenyl ester,
1,5-dihydroxy-4,8 - diamino - anthraquinone-2-sulphonic acid phenyl ester,
1,4 - diamino-2-bromo - anthraquinone-5-sulphonic acid phenyl ester.

The new compounds obtained according to the invention are valuable new dyestuffs. They are especially suitable for dyeing and printing fibre materials of cellulose esters, synthetic polyamides, polyurethanes, polyacrylonitriles and aromatic polyesters, especially polyethylene glycol terephthalates. The dyestuffs can be used as such or, preferably, in the form of an aqueous suspension. Compared with the dyestuffs without sulphonic acid phenyl ester groups, from which they are derived, these new compounds are characterised by improved fastness properties, particularly by a substantially improved fastness to light and sublimation.

In the following examples which are given for the purpose of illustrating the invention, the parts are parts by weight and the temperatures are given in degree centigrade.

EXAMPLE 1

20 parts 1-amino-4-bromo - anthraquinone-2-sulphonic acid chloride are introduced into a previously prepared mixture of 17 parts of the sodium salt of 3-chloro-6-methyl-phenol in 120 parts chlorobenzene. The reaction mixture is stirred at 20 to 25° for about 15 hours, the reaction product is precipitated with petroleum ether and extracted by stirring with water. 25 parts 1-amino-4-bromo-anthraquinone - 2 - sulphonic acid-(3'-chloro-6'-methyl-phenyl) ester are obtained.

160 parts chlorobenzene, 20 parts 1-amino-4-bromo-anthraquinone-2-sulphonic acid - (3'-chloro-6' - methylphenyl) ester, 10 parts p-toluene-sulphamide, 3.2 parts K₂CO₃ and 0.3 parts of a mixture of equal parts copper acetate, Cu₂Cl₂ and copper powder are stirred together at 120 to 130° for 60–90 minutes. The reaction product is allowed to crystallise, filtered off with suction at 15 to 20° and extracted by stirring with water and with methanol. 17.5 parts of 1-amino-4-p-toluene-sulphamido-anthraquinone-2-sulphonic acid-(3'-chloro-6'-methylphenyl) ester are obtained. A further amount of this ester can be isolated from the chlorobenzene filtrate.

12 parts of the ester obtained in Paragraph 2 are dissolved at 15 to 25° in 160 parts 96% sulphuric acid. After stirring for one hour, the reaction mixture is poured into ice water, the product is filtered off with suction, washed until neutral and dried. About 8 parts 1,4-diamino - anthraquinone - 2 - sulphonic acid - (3'-chloro-6'-methyl-phenyl) ester are obtained.

The dyestuff so obtained yields on polyester material brilliant reddish blue dyeings of good to very good fastness properties, especially very good fastness to sublimation.

EXAMPLE 2

12.8 parts sodium phenolate are heated in 78 parts o-dichlorobenzene to 45°. 40 parts 1-amino-4-bromo-anthraquinone-2-sulphonic acid chloride are slowly introduced at this temperature with good stirring, care being taken by cooling to keep the temperature of the reaction mixture between 40° and 50°. The mixture is subsequently stirred at 40 to 45° until the reaction is completed, 21.4 parts p-toluene-sulphamide, 8.3 parts K₂CO₃ and 0.2 part each of CuCl₂, Cu₂Cl₂ and Cu₂Br₂ are added, stirring is continued at 130° for one hour and the melt is diluted at 60° with 100 parts methanol. The mixture is then stirred at 10 to 20° for several hours and the reaction product obtained is filtered off with suction, washed with methanol and water, and dried.

The 1-amino-4-p-toluene - sulphamido-anthraquinone-2-sulphonic acid phenyl ester is dissolved at 15 to 30° in 460 parts 96% sulphuric acid and stirred at this temperature for one hour. The sulphuric acid solution is then poured on to a mixture of ice and water, stirred at normal temperature for several hours, the product is filtered off with suction, washed until neutral and dried. The 1,4-diamino-anthraquinone-2-sulphonic acid phenyl ester is obtained in a yield of about 93% (referred to the acid chloride used).

The dyestuff so obtained yields on polyester material brilliant reddish blue dyeings of good to very good fastness properties, especially good fastness to light and very good fastness to sublimation.

EXAMPLES 3 TO 11

In analogy with Example 1 or 2 there are obtained the dyestuffs of the following table which yield dyeings of good to very good fastness properties on polyester materials.

| Example: | Dyestuff | Shade |
|---|---|---|
| 3 | 1,4-diamino-anthraquinone-2-sulphonic acid (3'-methoxy-phenyl) ester. | Reddish blue. |
| 4 | 1,4-diamino-anthraquinone-2-sulfonic acid (4'-chloro-phenyl) ester. | Do. |
| 5 | 1,4-diamino-anthraquinone-2-sulphonic acid (2'-chloro-phenyl) ester. | Do. |
| 6 | 1,4-diamino-anthraquinone-2-sulphonic acid (3'-chloro-phenyl) ester. | Do. |
| 7 | 1,4-diamino-anthraquinone-2-sulphonic acid (4'-bromo-phenyl) ester. | Do. |
| 8 | 1,4-diamino-anthraquinone-2-sulphonic acid (4'-methylmercapto-phenyl) ester. | Do. |
| 9 | 1,4-diamino-anthraquinone-2-sulphonic acid β-naphthyl ester. | Do. |
| 10 | 1,4-diamino-anthraquinone-2-sulphonic acid (3',5'-dimethyl-4'-chloro-phenyl) ester. | Do. |
| 11 | 1,4-diamino-anthraquinone-2-sulphonic acid (2',3',5'-trimethyl-phenyl) ester. | Do. |

EXAMPLE 12

A mixture of 21.6 parts sodium phenolate in 120 parts diethylene glycol monomethyl ether is first prepared. After introducing 24.8 parts 1-amino-4-bromo-5-hydroxy-anthraquinone-2-sulphonic acid chloride at 0 to 5°, the mixture is stirred at 0–5° for 5 hours and at 20 to 25° for 15 hours, then diluted with 120 parts methanol and the reaction product is precipitated by slowly adding hydrochloric acid, filtered off with suction and washed with methanol. The filtered components are stirred with water, again filtered off, washed with water and with methanol, and dried. 23.8 parts 1-amino-4-bromo-5-hydroxy-anthraquinone-2-sulphonic acid phenyl ester are obtained.

160 parts chlorobenzene, 19.2 parts 1-amino-4-bromo-5-hydroxy-anthraquinone-2-sulphonic acid phenyl ester, 10 parts p-toluene-sulphamide, 3.2 parts K₂CO₃ and 0.4 part of a mixture of equal parts copper acetate, cuprous chloride and copper powder are stirred together at 120° for 2 hours. The reaction product is allowed to crystallise, filtered off with suction at 15–20° and extracted by stirring with water and with methanol at 50°. 16 parts 1-amino - 4-p-toluene-sulphamido-5-hydroxy-anthraquinone-2-sulphonic acid phenyl ester are obtained.

10 parts of the phenyl ester obtained in the preceding paragraph are dissolved at 15–25° in 180 parts 96% sulphuric acid. After stirring at 20–25° for one hour, the reaction mixture poured into ice-water, and after further stirring for one hour, the reaction product is filtered off with suction, washed until neutral and dried. 7.4 parts 1,4-diamino-5-hydroxy-anthraquinone-2-sulphonic acid phenyl ester are obtained.

The dyestuff so obtained yields blue dyeings of good to very good fastness properties on polyester material.

EXAMPLE 13

25 parts 1,4-diamino-2,3-dichloro-anthraquinone-6-sulphonic acid chloride are introduced at 15–30° into a previously prepared mixture of 20 parts sodium phenolate in 200 parts chlorobenzene. After stirring at 20–25° for 20 hours, the product is filtered off with suction and washed with chlorobenzene and petroleum ether. The filtered components are stirred with water, again filtered off and washed with water. There are obtained about 18 parts 1,4-diamino - 2,3 - dichloro-anthraquinone-6-sulphonic acid phenyl ester which yields on polyester materials blue dyeings of good to very good fasteness properties, especially very good fastness to sublimation.

EXAMPLE 14

17 parts 1,4-dihydroxy-anthraquinone-6-sulphonic acid chloride are introduced at 15–25° into a previously prepared mixture of 20 parts sodium phenolate in 150 parts diethylene glycol monomethyl ether. After a reaction time of 15 hours at 20–30°, the mixture is poured into dilute hydrochloric acid and the product is filtered off with suction and washed until neutral. If desired, the resultant 1,4-dihydroxy-anthraquinone-6-sulphonic acid phenyl ester can be purified from dimethyl formamide by the addition of water or by recrystallisation from toluene. The dyestuff yields orange-yellow dyeings of good to very good fastness properties on polyester materials.

EXAMPLE 15

20 parts 1-amino-4-bromo-anthraquinone-2-sulphonic acid chloride are introduced at 20–30° into a previously prepared mixture of 18 parts 2,4-dichlorophenol sodium salt in 100 parts chlorobenzene. After a reaction time of 5 hours at 20–25° the mixture is diluted with petroleum ether, the product is filtered off with suction and washed with petroleum ether. The filtered components are stirred with water, then again filtered off with suction and washed with water and with methanol. 25.7 parts 1-amino-4-bromo - anthraquinone - 2-sulphonic acid-(2',4'-dichlorophenyl) ester are obtained. 140 parts chlorobenzene, 21.2 parts 1-amino-4-bromo-anthraquinone-2-sulphonic acid-(2',4'-dichlorophenyl) ester, 10 parts p-toluene-sulphamide, 3.2 parts K₂CO₃ and 0.5 part of a mixture of equal parts copper acetate, cuprous bromide and copper powder are stirred together at 130° for 2 hours. The product is allowed to crystallise at 15–20°, filtered off with suction, and washed with petroleum ether. The filtered components are stirred with water, again filtered off with suction, and washed with methanol and dried. 15 parts 1-amino-4-p-toluene - sulphamido-anthraquinone-2-sulphonic acid-(2', 4'-dichlorophenyl) ester are obtained. The yield can be substantially increased by working up the chlorobenzene filtrate.

12 parts of the above ester are dissolved at 15–25° in 180 parts 96% sulphuric acid. After stirring at 20–25° for one hour, the reaction mixture is poured into ice-water and further stirred for one hour, the product is filtered off wtih suction, washed until neutral and dried at 80°. About 8 parts 1,4-diamino-anthraquinone-2-sulphonic acid-2',4'-dichlorophenyl) ester are obtained.

On polyester materials the dyestuff yields brilliant reddish blue dyeings of good to very good fastness properties, especially very good fastness to sublimation.

EXAMPLES 16 TO 27

In analogy with Example 13 there are obtained the dyestuffs of the following constitution, which yield dyeings of good to very good fastness properties on polyester materials.

| Example | Dyestuff | Shade |
|---|---|---|
| 16 | 1,4-diamino-anthraquinone-2-sulphonic acid (3'-nitro-phenyl) ester. | Reddish blue. |
| 17 | 1,4-diamino-anthraquinone-2-sulphonic acid (4'-tert.-butyl-phenyl) ester. | Do. |
| 18 | 1,4-diamino-anthraquinone-2-sulphonic acid (4'-trifluoromethyl-phenyl) ester. | Do. |
| 19 | 1,4-diamino-anthraquinone-2-sulphonic acid (4'-phenyl-phenyl) ester. | Do. |
| 20 | 1,4-diamino-anthraquinone-2-sulphonic acid (4'-acetyl-phenyl) ester. | Do. |
| 21 | 1,4-diamino-anthraquinone-2-sulphonic acid (3'-methyl-4'-methylmercapto-phenyl) ester. | Do. |
| 22 | 1,4-diamono-anthraquinone-2-sulphonic acid (4'-carbomethoxy-phenyl) ester. | Do. |
| 23 | 1,4-diamino-anthraquinone-2-sulphonic acid (3'-methylene-sulphone-4—-ether-phenyl) ester. | Do. |
| 24 | 1,4-diamino-5-nitro-anthraquinone-2-sulphonic acid phenyl ester. | Medium blue. |
| 25 | 1,4-diamino-5-chloro-anthraquinone-2-sulphonic acid phenyl ester. | Reddish blue. |
| 26 | 1,4-diamino-6-chloro-anthraquinone-2-sulphonic acid phenyl ester. | Do. |
| 27 | 1,4-diamino-7-chloro-anthraquinone-2-sulphonic acid phenyl ester. | Do. |

EXAMPLE 28

22 parts sodium phenolate are dissolved in 120 parts diethylene glycol monomethyl ether and 18 parts 1-amino-4-bromo - 5,8 - dihydroxy-anthraquinone-2-sulphonic acid chloride are introduced at 0–5°. The reaction mixture is subsequently stirred at 0–5° for 8 hours and at 20–25° for 12 hours. The mixture is poured into water, acidified, the product is filtered off with suction and washed until neutral. The filtered components are again stirred with water and dried. About 16 parts 1-amino-4-bromo-5,8-dihydroxy-anthraquinone-2-sulphonic acid phenyl ester are obtained, which can be purified, if desired, by treating it with dimethyl formamide and some water.

90 parts chlorobenzene, 6 parts p-toluene-sulphamide, 1.8 parts K₂CO₃, 9 parts of the ester obtained in Paragraph 1 and 0.2 part of a mixture of equal parts copper acetate, cuprous bromide and copper powder are stirred at 130° for 3 hours. The product is allowed to crystallise, filtered off with suction at 20°, washed with petroleum ether and the filtered components are stirred with water and methanol. 8.4 parts 1-amino-4-p-toluene-sulphamido-5,8-dihydroxy-anthraquinone - 2 - sulphonic acid phenyl ester are obtained.

8.2 parts of the ester obtained in Paragraph 2 are dissolved at 15–25° in 100 parts 96% sulphuric acid. After stirring at 20–25° for one hour, the 1,4-diamino-5,8-dihydroxy-anthraquinone-2-sulphonic acid phenyl ester is isolated by slowly adding 50 parts water while cooling, then filtering off with suction and washing and drying the filtered material.

The resultant dyestuff yields greenish blue dyeings of good to very good fastness properties on polyester materials.

EXAMPLE 29

32 parts acetonitrile, 10 parts aniline, 8 parts 1-amino-4 - bromo-anthraquinone-2-sulphonic acid phenyl ester (prepared in analogy with Example 1, Paragraph 1), 8 parts sodium acetate, and 0.2 part of a mixture of equal parts copper acetate, cuprous bromide, cuprous chloride and copper powder are stirred at boiling temperature for 30 hours. The mixture is subsequently suction-filtered, the filtered components are stirred with methanol and with water and washed. There are obtained about 5 parts 1-amino-4-anilino-anthraquinone-2-sulphonic acid phenyl ester which yields greenish blue dyeings of good to very good fastness properties on polyester materials.

EXAMPLE 30

A mixture is prepared from 16 parts of the disodium salt of 3-hydroxy-benzoic acid in 100 parts deithylene glycol monomethyl ether. 16 parts 1-amino-4-bromo-anthraquinone-2-sulphonic acid chloride are introduced at 15–25°. The reaction mixture is stirred at 20–30° for 8 hours. The melt is then introduced into 440 parts 4% hydrochloric acid, stirred for some time, the product is filtered off with suction and washed. After drying, about 15 parts 1-amino-4-bromo-anthraquinone - 2 - sulphonic acid-(3'-carboxy-phenyl) ester are obtained.

120 parts chlorobenzene, 10 parts 1-amino-4-bromo-anthraquinone-2-sulphonic acid-(3'-carboxy-phenyl) ester, 5 parts p-toluene-sulphamide, 3.2 parts $K_2CO_3$ and 0.3 part of a mixture of equal parts copper acetate, cuprous chloride and copper powder are stirred together at 130° for 1 hour. The reaction mixture is cooled to 20°, introduced into petroleum ether, the product is filtered off with suction and washed with petroleum ether. The filtered components are stirred with dilute hydrochloric acid, again filtered off with suction and thoroughly washed with water and methanol, and dried. 11.5 parts 1-amino-4-p-toluene - sulphamido-anthraquinone-2-sulphonic acid-(3'-carboxy-phenyl) ester are obtained.

10 parts of the ester described in Paragraph 2 are dissolved at 10–25° in 180 parts 96% sulphuric acid. After stirring for one hour, the reaction mixture is poured on to ice, the product is filtered off with suction and washed until neutral. About 7.3 parts 1,4-diamino-anthraquinone-2-sulphonic acid-(3'-carboxy-phenyl) ester are obtained. The dyestuff yields on polyester materials brilliant reddish blue dyeings of good to very good fastness properties, especially very good fastness to sublimation.

EXAMPLE 31

A mixture of 13 parts of the dipotassium salt of 3-hydroxy-benzoic acid in 90 parts diethylene glycol monomethyl ether is first prepared. 10 parts 1,4-diamino-2,3-dichloro-anthraquinone-6-sulphonic acid chloride are introduced at 15–25°. After stirring at 20–30° for 20 hours, the reaction mixture is poured into dilute hydrochloric acid. The suspension is suction-filtered and the filtrate is washed until neutral and dried. There is obtained in good yield the 1,4-diamino-2,3-dichloro-anthraquinone-6-sulphonic acid-(3'-carboxy-phenyl) ester which yields on polyester materials blue dyeings of good to very good fastness properties, especially a very good fastness to sublimation.

EXAMPLE 32

50 parts 1,5 - dihydroxy - 4,8-diamino-anthraquinone-2-sulphonic acid (sodium salt) are introduced into 260 parts chlorosulphonic acid while cooling with ice. After the addition of 40 parts thionyl chloride, the reaction mixture is slowly heated to 70° while stirring. After stirring at 70° for 6 hours and at 90° for two hours, the cold melt is added dropwise to a mixture of 1000 parts ice and 200 parts sodium chloride. The precipitated sulphochloride is filtered off with suction and washed several times with a little ice-water. The moist filter cake is stirred into a mixture of 150 parts sodium phenolate, 500 parts water and 100 parts sodium chloride. After stirring at 50° for one hour, the product is filtered off with suction, washed until neutral and dried. The crude product is dissolved hot in 400 parts pyridine to remove the adhering sulphonic acid. After separating the insoluble components, the reaction mixture is diluted with 2000 parts hot water. The dyestuff which is precipitated in the form of dark blue needles is filtered off with suction, washed, freed from the adhering pyridine by means of dilute hydrochloric acid, washed until neutral and dried. The 1,5-dihydroxy-4,8-diamino anthraquinone-2-sulphonic acid phenyl ester so obtained dyes polyester fibres in clear blue shades of very good fastness to light and sublimation.

EXAMPLE 33

A blue dyestuff of similar fastness properties is obtained by using in Example 32, instead of the 1.5-dihydroxy-4,8 - diamino - anthraquinone - 2 - sulphonic acid, the same amount of 1,8 - dihydroxy-4,5-diamino-anthraquinone-2-sulphonic acid (sodium salt).

EXAMPLE 34

50 parts 1,4-dihydroxy-anthraquinone-2-sulphonic acid (sodium salt) are introduced into 260 parts chlorosulphonic acid while cooling with ice. After the addition of 30 parts thionyl chloride, the reaction mixture is stirred at 70° for 5 hours and at 80–90° for 5 hours. The cold melt is added dropwise, while stirring, to a mixture of 1000 parts ice and 200 parts sodium chloride. The precipitated sulphochloride is filtered off with suction, washed several times with an ice-cold 20% sodium solution and introduced into a mixture of 90 parts sodium phenolate, 60 parts sodium chloride and 300 parts water. After a reaction time of 2 hours at 50°, the product is filtered off with suction while warm and washed with water. The dried crude product is dissolved hot in 250 parts pyridine. After separating the insoluble components, the mixture is diluted with 700 parts hot water. The precipitated dyestuff is filtered off with suction, boiled with dilute hydrochloric acid, filtered off with suction, washed until neutral and dried. The 1,4 - dihydroxy-anthraquinone-2-sulphonic acid phenyl ester so obtained can be recrystallised from glacial acetic acid, if desired; it dyes polyester fibres in orange shades of very good fastness to light and sublimation.

EXAMPLE 35

45 parts 1-nitro-anthraquinone-6-sulphonic acid chloride are introduced with good stirring into a mixture of 50 parts sodium phenolate and 500 parts o-dichlorobenzene. The reaction is completed by stirring at 60° for 30 minutes. The stiff crystal slurry thus obtained is filtered off with suction when cold, washed with o-dichlorobenzene and methanol, and boiled with water. 47.4 parts of crystallised 1-nitro-anthraquinone-6-sulphonic acid phenyl ester are thus obtained in the form of homogeneous needles.

40 parts 1-nitro-anthraquinone-6-sulphonic acid phenyl ester are reduced in a mixture of 50 parts of 18% sodium hydrosulphide solution and 400 parts water by heating at 90–100° for one hour. After suction-filtration, washing and drying, 32 parts of crystallised 1-amino-anthraquinone-6-sulphonic acid phenyl ester are obtained in the form of homogeneous needles.

32 parts 1 - amino - anthraquinones-6-sulphonic acid phenyl ester are brominated at 50–60° in 600 parts glacial acetic acid with the addition of 0.1 part iodine by the dropwise addition of 31 parts bromine. The reaction is completed by heating at boiling temperature for 30 minutes. After cooling, the precipitated red needles are filtered off with suction, washed with glacial acetic acid and methanol and dried. 41 parts 1-amino-2,4-dibromo-anthraquinone-6-sulphonic acid phenyl ester are thus obtained.

40 parts 1 - amino - 2,4 - dibromo-anthraquinone-6-sulphonic acid phenyl ester are heated at 140–150° together with 110 parts o-dichlorobenzene, 40 parts p-toluenesulphamide, 14 parts potassium acetate, 0.4 part copper acetate, 0.4 part cupric oxide and 0.4 part cuprous chloride. When only a trace of the starting material can still be detected by chromatography (after about 90 minutes), the reaction mixture is allowed to cool to 80–100° and diluted with about 400–500 parts methanol, while stirring. The precipitated needles are filtered off with suction and washed with methanol. The filter cake is stirred with hot dilute (appr. 1%) hydrochloric acid, filtered off with suction, washed until neutral and dried. There are obtained 38.6 parts 1 - amino - 2 - bromo - 4 - tosylamino-anthraquinone-6-sulphonic acid phenyl ester which dyes polyester fibres in red-violet shades of very good fastness to light and sublimation.

EXAMPLE 36

33 parts 1-nitro-anthraquinone-5-sulphonic acid chloride are introduced with good stirring into a mixture of 20 parts phenol, 15 parts triethylamine and 300 parts o-dichlorobenzene. The reaction is completed by heating at 50° for one hour. The product is filtered off with suction when cold, washed with a little o-dichlorobenzene and methanol, and stirred with hot water. After suction-filtration- washing and drying, 34.5 parts crystallised 1-nitro-anthraquinone-5-sulphonic acid phenyl ester are obtained in the form of yellowish needles.

14 parts iron powder are added at 60–80° in the course of one hour to a mixture of 33 parts 1-nitro-anthraquinone-5-sulphonic acid phenyl ester, 330 parts glacial acetic acid and 1 part hydrochloric acid. The reaction is completed by heating at 80–90° for one hour. The reaction mixture is then diluted with 160 parts water, filtered off with suction when cold, the moist filter cake is stirred with warm dilute hydrochloric acid, again filtered off with suction, washed until neutral and dried. There are obtained 30 parts 1-amino-anthraquinone-5-sulphonic acid phenyl ester which is sufficiently pure for the further reaction. If desired, it can be recrystallised from 10 parts o-dichlorobenzene, 24.5 parts of homogeneous red needles being thus obtained.

22 parts 1-amino-anthraquinone-5-sulphonic acid phenyl ester are brominated at 80–100° in 300 parts glacial acetic acid with the addition of 0.1 part iodine by means of 25 parts bromine. After boiling for one hour, the reaction mixture is poured on to ice, the product is filtered off with suction, washed until neutral and dried. There are obtained 31.1 parts 1-amino-2,4-dibromo-anthraquinone-5-sulphonic acid phenyl ester which can be recrystallised from o-dichlorobenzene, if desired.

50 parts 1-amino - 2,4 - dibromo-anthraquinone-5-sulphonic acid phenyl ester are heated to 150° together with 150 parts o-dichlorobenzene, 40 parts p-toluene-sulphonamide, 15 parts potassium acetate, 0.4 part copper acetate, 0.4 part cupric oxide and 0.4 part cuprous chloride. After a reaction time of 1–2 hours, the mixture is allowed to cool to 80–100° and diluted with 750 parts methanol. The precipitated needles are filtered off with suction and washed with methanol. The filter cake is stirred with hot dilute (appr. 1%) hydrochloric acid, filtered off with suction, washed with hot water until neutral and dried. There are obtained 49.5 parts 1-amino-2-bromo-4-tosylamino-anthraquinone-5-sulphonic acid phenyl ester which dyes polyester fibres in red-violet shades of very good fastness to sublimation.

EXAMPLE 37

When, instead of 1-nitro-anthraquinone-5-sulphonic acid chloride, there is used in Example 36, paragraph 1, the same amount of 1-nitro-anthraquinone-8-sulphonic acid chloride and the procedure of paragraphs 2, 3 and 4 is then followed, there is obtained 1-amino-2-bromo-4-tosylamino-anthraquinone-8-sulphonic acid phenyl ester which dyes polyester fibres in red-violet shades of very good fastness to sublimation. It is also possible to use a mixture of 5- and 8-sulphonic acid chlorides as is obtained by reacting a technical mixture of 1-nitro-anthraquinone-5- and -8-sulphonic acid with phosphorus oxychloride/phosphorus pentachloride.

EXAMPLE 38

When, instead of 1-nitro-anthraquinone-5-sulphonic acid chloride, there is used in Example 36, paragraph 1, the same amount of 1-nitro-anthraquinone-7-sulphonic acid chloride and the procedure of paragraphs 2, 3 and 4 is then followed, there is obtained 1-amino-2-bromo-4-tosylamino-anthraquinone-7-sulphonic acid phenyl ester which dyes polyester fibres in red-violet shades of very good fastness to sublimation.

EXAMPLE 39

20 parts 1-amino-2-bromo-4-tosylamino-anthraquinone-6-sulphonic acid phenyl ester obtained according to Example 29, are stirred at 20° into 550 parts concentrated sulphuric acid. After stirring at 20–30° for 15 to 20 minutes, the clear solution is poured on to ice, the precipitated dark blue dyestuff is filtered off with suction and washed until neutral. The moist filter cake is suspended in hot water, rendered ammonical and stirred for some time at 50–60°. The product is then filtered off with suction, thoroughly washed with hot water and dried. There are obtained 14.6 parts 1,4-diamino-2-bromo-anthraquinone-6-sulphonic acid phenyl ester which dyes polyester fibres in clear reddish blue shades of good fastness to light and very good fastness to sublimation. The compound can be obtained in a homogeneously crystallised form by recrystallisation from o-dichlorobenzene.

EXAMPLES 40 TO 42

Similar blue polyester dyestuffs are obtained, when, instead of 1-amino-2-bromo-4-tosylamino-anthraquinone-6-sulphonic acid phenyl ester, there are used in Example 39 the same amounts of the tosylamino compounds obtained according to Examples 36, 37 and 38.

| Example: | Starting material according to example | Final product |
|---|---|---|
| 40 | 36 | 1,4-diamino-2-bromo-anthraquinone-5-sulphonic acid phenyl ester. |
| 41 | 37 | 1,4-diamino-2-bromo-anthraquinone-8-sulphonic acid phenyl ester. |
| 42 | 38 | 1,4-diamino-2-bromo-anthraquinone-7-sulphonic acid phenyl ester. |

Obviously, it is also possible to use other phenols, instead of the phenol or sodium phenolate employed in Example 35, paragraph 1, and Example 36, paragraph 1. Similar violet polyester dyestuffs are then obtained according to Examples 35–38 and similar blue polyester dyestuffs according to Examples 39–42. Examples of other phenols are m-chlorophenol, o-cresol and m-methoxy phenol.

EXAMPLE 43

0.1 part pyrolusite is added to a well stirred mixture of 11.3 parts 1,4-diamino - 2 - bromo-anthraquinone-6-sulphonic acid phenyl ester obtained according to Example 39 and 170 parts 70% sulphuric acid. The reaction mixture is heated at 70–80° for 15 minutes, whereby an approximately clear solution will usually occur, from which uniform yellow needles are immediately precipitated. After heating at 90° for a short time, the product is filtered off with suction when cold and washed with 70% sulphuric acid. The filter cake is boiled in water, uniform violet crystals being thus obtained. After filtering off with suction, washing and drying, there are obtained 10.2 parts of a 1-hydroxy-2- or -3-bromo-4-aminoanthraquinone-6-sulphonic phenyl ester. The compound dyes polyester fibres in clear violet shades of very good fastness to light and sublimation.

EXAMPLES 44 TO 46

When the procedure described in Example 43 is followed, but instead of 1,4-diamino-2-bromo-anthraquinone-6-sulphonic acid phenyl ester, the compounds obtained according to Examples 40–42 are used, similar violet polyester dyestuffs are obtained.

| Starting material according to example | Final product |
|---|---|
| Example: | |
| 44 | 40 1-hyroxy-2- or -3-bromo-4-amino-anthraquinone-5- or -8-sulphonic acid phenyl ester. |
| 45 | 41 1-hydroxy-2- or -3-bromo-4-amino-anthraquinone-8- or -5-sulphonic acid phenyl ester. |
| 46 | 42 1-hydroxy-2- or -3-bromo-4-amino-anthraquinone-6- or -7- sulphonic acid phenyl ester. |

EXAMPLE 47

10 parts skein material of polyethylene glycol terephthalate are dyed at 96–98° for two hours in a bath consisting of 600 parts water, 0.1 part of finely divided 1,4-diamino-anthraquinone - 2 - sulphonic acid-(3'-chloro-6'-methyl-phenyl) ester obtained according to Example 1, 3.4 parts of a mixture of o-, m-, p-cresotic acid methyl ester and 0.6 part of a mixture of equal parts aralkyl sulphonate and a non-ionic polyglycol ether, after sulphuric acid has been added until a pH value of 4.5 is adjusted. The material is subsequently rinsed and dried. The fastness to ribbing can be improved by after-treating for 10–30 minutes in a gently boiling bath containing, per 1000 parts water, 5.5 parts sodium hydroxide solution at 38° Bé, 2 parts sodium dithionite and 1 part of a polyglycol ether of a fatty acid amide. A reddish blue dyeing of good to very good fastness properties is obtained, especially of very good fastness to sublimation.

Dyeing with the dyestuffs obtained according to Examples 2–29 and 32–46 can be carried out in the same manner.

EXAMPLE 48

10 parts of a fabric of polyethylene glycol terephthalate are dyed at 120–130° for 2 hours in a bath at pH 4.5 consisting of 400 parts water, 0.1 part of the very finely divided 1,4-diamino-anthraquinone-2-sulphonic acid-(2',4'-dichloro-phenyl) ester obtained according to Example 15, and 0.3 part of a mixture of equal parts of an aralkyl sulphonate and a non-ionic polyglycol ether. After rinsing and drying, a brilliant reddish blue dyeing of good to very good fastness properties is obtained, especially of very good fastness to sublimation.

Dyeing with the dyestuffs obtained according to Examples 1–14, 16–29 and 32–46 can be carried out in the same manner.

EXAMPLE 49

A fabric of polyethylene glycol terephthalate fibres is impregnated on the foulard with a liquor containing, per 1000 parts, 20 parts of the finely divided 1,4-diamino-anthraquinone - 2 - sulphonic acid-(3'-chloro-6'-methyl-phenyl) ester obtained according to Example 1 and 10 parts thermosol auxiliaries, especially a polyethylene ether as described, for example, in Belgian patent specification No. 615,102.

The fabric is then squeezed to a weight increase of 70% and dried in a suspended nozzle drier or drying cabinet at 80–120°. The fabric is subsequently treated in a stenter or nozzle hot flue with hot air at 190–200° for about 45 seconds, then rinsed, reductively after-treated, if desired, and dried. The reductive after-treatment to remove dyestuff particles superficially adhering to the fibre can be carried out in such a manner that the fabric is introduced at 20–25° into a liquor containing 3–5 cc./litre sodium hydroxide solution at 38° Bé and 1–2 g./litre concentrated hydrosulphite, then heated to 70° in about 15 minutes and kept at 70° for a further 10 minutes. The fabric is then rinsed hot, acidified at 50° with 2–3 cc./litre 85% formic acid, rinsed and dried. A clear reddish blue dyeing is obtained which is characterised by a high dyestuff yield and good texturing power and by good to very good fastness properties.

Dyeing with the dyestuffs obtained according to Examples 2–29 and 32–46 can be carried out in the same manner.

EXAMPLE 50

10 parts skein material of cellulose triacetate are dyed at 96–98° for one hour in a bath containing 400 parts water, 0.2 part of the finely divided 1,4-diamino-2-bromo-anthraquinone-6-sulphonic acid phenyl ester obtained according to Example 39, 3.4 parts of a mixture of o-, m-, p-cresotic acid methyl ester and 0.6 part of a mixture of equal parts aralkyl sulphonate and a non-ionic polyglycol ether, after adjusting a pH value of 5 by means of formic acid. A clear reddish blue dyeing of good fastness properties is obtained. Instead of dyeing at 96–98° for one hour, it is also possible to dye at 120–130° for one hour in a closed vessel.

Dyeing with the dyestuffs obtained according to Examples 1–29, 32–38 and 40–46 can be carried out in the same manner.

EXAMPLE 51

10 parts of a fabric of synthetic polyamide in a bath containing 400 parts water, 0.2 part 1,4-diamino-anthraquinone-2-sulphonic acid phenyl ester obtained according to Example 2 in finely divided form, and 0.2 part of a conventional dispersing agent are slowly heated to boiling temperature and dyed at the boil for one hour. The material is subsequently rinsed, weakly soaped, if desired, and dried. A reddish blue dyeing of good fastness to washing, light and rubbing is obtained.

Dyeing with the dyestuffs obtained according to Examples 1, 3–29 and 32–46 can be carried out in the same manner.

EXAMPLE 52

15 parts 1,4-dichloro-anthraquinone-6-sulphonic acid chloride are introduced into a mixture of 10 parts phenol, 5 parts triethylamine and 150 parts toluene and heated at 100° for one hour. The mixture is suction-filtered when cold and the filtrate freed from the solvent by means of steam. The residue after distillation is extracted by stirring with a cold dilute sodium carbonate solution, filtered off with suction, washed until neutral and dried. 16.4 parts 1,4-dichloro-anthraquinone-6-sulphonic acid phenyl ester are obtained.

5 parts 1,4-dichloro-anthraquinone-6-sulphonic acid phenyl ester are heated at 160° for 2 hours together with 5 parts sodium acetate, 15 parts p-toluene-sulphamide and 0.3 part copper acetate. The melt is diluted at 80–100° with about 50 parts methanol. The precipitated reaction product is filtered off with suction, washed with methanol and then stirred with hot dilute (about 1%) hydrochloric acid. After filtering off with suction, washing and drying, 6.9 parts 1,4-bis-tosylamino-anthraquinone-6-sulphonic acid phenyl ester are obtained. 6.9 parts 1,4-bis-tosyl-amino-anthraquinone-6-sulphonic acid phenyl ester are stirred at 20° into 150 parts concentrated sulphuric acid. After stirring at 20 to 30° for 15 minutes, the clear solution is poured on to ice, the precipitated dark blue dyestuff is filtered off with suction and washed until neutral. The moist filter cake is suspended in hot water, rendered ammoniacal and stirred at 50 to 60° for some time. The product is then filtered off with suction, washed with hot water and dried. There are obtained 3.8 parts 1,4-diamino-anthraquinone-6-sulphonic acid phenyl ester which can be purified by dissolving it in 10 parts pyridine, diluting the solution with 10 parts methanol and 10 parts water, filtering and slowly mixing the filtrate with 35 parts water. After filtering off with suction, washing with water, stirring with warm dilute hydrochloric acid, again filtering off with suction and washing the dyestuff is obtained in the form of homogeneous blue needles (yield 3.4 parts). The 1,4-diamino-anthraquinone-6-sulphonic acid phenyl ester dyes polyester fibres, for example according to Examples 47 to 51, in clear blue shades of good fastness to sublimation and light.

What is claimed is:

1. Anthraquinone dyestuff of the formula

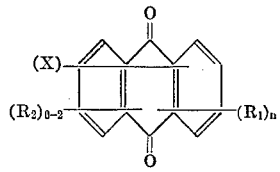

wherein

R₁ represents a member selected from the group consisting of hydroxyl, methoxy, phenoxy, phenyl mercapto, amino, lower alkyl substituted amino, phenyl substituted amino, lower aliphatic acyl substituted amino, lower alkyl sulfonyl substituted amino, or tosylamino, wherein lower means 1–4 carbon atoms and wherein $n$ is an integer of at least 2;

R₂ is chlorine or bromine; and

X is selected from the group consisting of sulfonic acid phenyl ester, sulfonic acid naphthyl ester, and sulphonic acid substituted phenyl ester, wherein the substituents in the phenyl ester group comprise 1–3 members of the class consisting of halogen, lower alkyl, hydroxyl, phenyl, lower alkoxy, lower alkyl mercapto, lower alkyl sulfonyl, nitro, carboxy, lower carbalkoxy, acetyl, benzoyl, and trifluoromethyl, said anthraquinone dyestuff containing no other sulfonic or sulfinic acid groups 2. Anthraquinone dyestuff of claim 1 wherein X is a sulphonic acid substituted phenyl ester.

3. Anthraquinone dyestuff of claim 2 wherein the members R₁ are hydroxyl or amino.

4. Anthraquinone dyestuff of claim 1 wherein X is the sulphonic acid phenyl ester.

5. Anthraquinone dyestuff of claim 1 wherein the members R₁ are hydroxyl or amino and X is sulphonic acid phenyl ester, sulphonic acid halogen substituted phenyl ester, sulphonic acid lower alkyl substituted phenyl ester, or sulphonic acid lower alkoxy substituted phenyl ester.

6. Dyestuff of claim 1 selected from the group consisting of

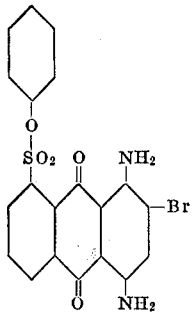

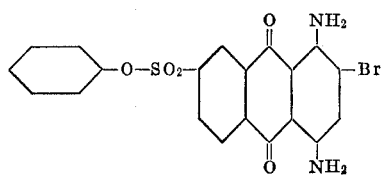

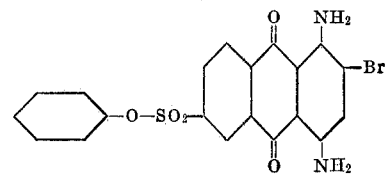

and

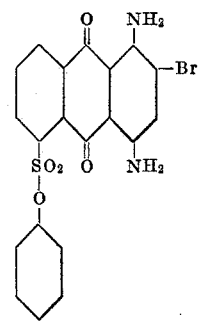

7. Dyestuff of claim 1 of the formula

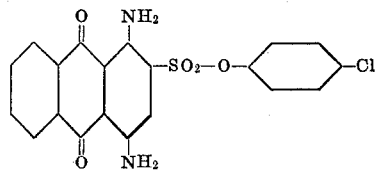

8. Dyestuff of claim 1 of the formula

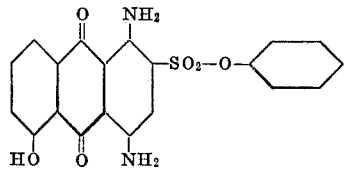

9. Dyestuff of claim 1 of the formula

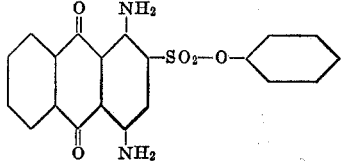

10. Dyestuff of claim 1 of the formula

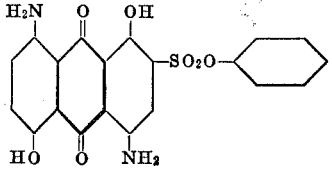

References Cited

FOREIGN PATENTS 627,092  7/1963  Belgium _____ 260—373

LORRAINE A. WEINBERGER, Primary Examiner

E. J. SKELLY, Assistant Examiner

U.S. Cl. X.R.

8—39, 40; 260—370, 372, 373, 374, 375